US008335811B2

(12) United States Patent
Zhong (10) Patent No.: US 8,335,811 B2
(45) Date of Patent: *Dec. 18, 2012

(54) METHOD AND SYSTEM FOR HIGH FIDELITY IDCT AND DCT ALGORITHMS

(75) Inventor: Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1612 days.

This patent is subject to a terminal disclaimer.

(21) Appl. No.: 11/513,921

(22) Filed: Aug. 31, 2006

(65) Prior Publication Data

US 2006/0294172 A1 Dec. 28, 2006

Related U.S. Application Data (63) Continuation-in-part of application No. 11/073,306, filed on Mar. 3, 2005, now abandoned.

(60) Provisional application No. 60/550,244, filed on Mar. 4, 2004, provisional application No. 60/723,224, filed on Oct. 3, 2005.

(51) Int. Cl.
*G06F 17/14* (2006.01)
(52) U.S. Cl. ........................................ 708/401; 708/402
(58) Field of Classification Search ........... 708/400–409
See application file for complete search history.

(56) References Cited

U.S. PATENT DOCUMENTS

| | | | | | |
|---|---|---|---|---|---|
| 5,394,349 | A | * | 2/1995 | Eddy | 708/401 |
| 5,590,067 | A | * | 12/1996 | Jones et al. | 708/401 |
| 5,594,678 | A | * | 1/1997 | Jones et al. | 708/402 |
| 5,596,517 | A | * | 1/1997 | Jones et al. | 708/402 |
| 5,754,457 | A | * | 5/1998 | Eitan et al. | 708/402 |
| 6,052,703 | A | * | 4/2000 | Redford | 708/402 |
| 6,167,161 | A | * | 12/2000 | Oami | 708/402 |
| 6,587,590 | B1 | * | 7/2003 | Pan | 708/402 |
| 7,035,332 | B2 | * | 4/2006 | He et al. | 708/402 |
| 2001/0031096 | A1 | * | 10/2001 | Schwartz et al. | 708/402 |
| 2003/0078953 | A1 | * | 4/2003 | Hallapuro et al. | 708/402 |
| 2004/0117418 | A1 | * | 6/2004 | Vainsencher et al. | 708/402 |
| 2005/0004964 | A1 | * | 1/2005 | Luo | 708/403 |

* cited by examiner

*Primary Examiner* — Chuong N Ngo
(74) *Attorney, Agent, or Firm* — Thomas Horstemeyer, LLP (57) ABSTRACT

In a data processing system, a method and system employing high fidelity inverse discrete cosine transform (IDCT) and discrete cosine transform (DCT) algorithms are provided. The values of the coefficients in a two-dimensional (2D) transform utilized in the IDCT and DCT algorithms may approximate the ideal integer output with sufficient visual quality. The transform coefficients may match a portion of the most significant bits (MSBs) or properly rounded bits of the coefficients of a reference transform matrix within an upper bound. The IDCT and DCT algorithms may specify constraints based on separating the 2D transform operation into two 1D transform operations in order to determine a minimum-bit width for each of the transform coefficients. The minimum-bit width may also be based on integer-bit precision of the data to be processed by the IDCT and DCT algorithms.

24 Claims, 7 Drawing Sheets

FIG. 7

METHOD AND SYSTEM FOR HIGH FIDELITY IDCT AND DCT ALGORITHMS

CROSS-REFERENCE TO RELATED APPLICATIONS/INCORPORATION BY REFERENCE

This application is a continuation-in-part of U.S. patent application Ser. No. 11/073,306 filed Mar. 3, 2005 now abandoned, which makes reference to, claims priority to, and claims the benefit of U.S. Provisional Application Ser. No. 60/550,244 filed Mar. 4, 2004. This application also makes reference to, claims priority to, and claims the benefit of U.S. Provisional Application Ser. No. 60/723,224 filed Oct. 3, 2005.

Each of the above stated applications is hereby incorporated herein by reference in its entirety.

FIELD OF THE INVENTION

Certain embodiments of the invention relate to the processing of signals. More specifically, certain embodiments of the invention relate to a method and system employing high fidelity inverse discrete cosine transform (IDCT) and discrete cosine transform (DCT) algorithms.

BACKGROUND OF THE INVENTION

In signal processing systems, the ability to efficiently and accurately reconstruct encoded or compressed data may generally depend on the compatibility of the encoding process and the decoding process. When the encoding and decoding are provided by different systems, for example, when systems from different vendors are utilized, mismatches may occur and the decoding system may have to correct these mismatches by providing additional hardware and/or software resources. Without these additional resources present in the decoding system, the mismatches that may occur may not be correctable and the reconstruction fidelity may significantly degrade.

In video systems, for example, where various implementations of the discrete cosine transform (DCT) and the inverse discrete cosine transform (IDCT) have been used for compression and decompression in a variety of video coding formats, mismatches tend to reduce image quality and may require significant computational complexity to correct. Since a wide range of vendors and/or implementations exist in video systems, mismatch compensation or mismatch correction may generally become a difficult issue to solve. In this regard, several standardization efforts have been initiated to address this concern.

One of the variations of the DCT/IDCT transform pair is in the form of an integer transform. The integer transform usually has the property of an exact inverse relationship between the DCT and IDCT by providing strict constraints on the integer values to be used in implementations. This approach, however, limits that ability of system designers to utilize architectures of different precision that may provide additional benefits to the overall design. A more traditional way of implementing the DCT/IDCT transform pair in video coding applications is by specifying the transform accuracy requirements statistically and then utilizing sample data streams to test whether the implementation meets certain specified requirements. However, while different implementations may statistically fall within the specified requirements for a chosen set of sample data streams, these implementations may still produce significant mismatch errors when used in coding/decoding systems. Moreover, the chosen set of sample data streams may not provide sufficient coverage of the specified requirements to guarantee mismatch-free implementation.

The same considerations may extend to any implementation of forward/inverse transform pairs that may be utilized to perform coding/decoding operations. When transform pairs are implemented using strict constraints, high fidelity reconstruction may be achieved but design flexibility may be significantly limited. On the other hand, when transform pairs are implemented based on statistical requirements, flexible systems may be constructed but mismatch error control operations may still be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method employing high fidelity inverse discrete cosine transform (IDCT) and discrete cosine transform (DCT) algorithms, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system employing high fidelity IDCT and DCT algorithms. Aspects of the invention may comprise utilizing two-dimensional (2D) transform in IDCT and DCT algorithms with values of the coefficients that may enable the algorithms to approximate the ideal integer output with sufficient visual quality. The transform coefficients may match a portion of the most significant bits (MSBs) or properly rounded bits of the coefficients of a reference transform matrix within an upper bound. The IDCT and DCT algorithms may specify constraints based on separating the 2D transform operation into two 1D transform operations in order to determine a minimum-bit width for each of the transform coefficients. The minimum-bit width may also be based on integer-bit precision of the data to be processed by the IDCT and DCT algorithms.

Figure 1:
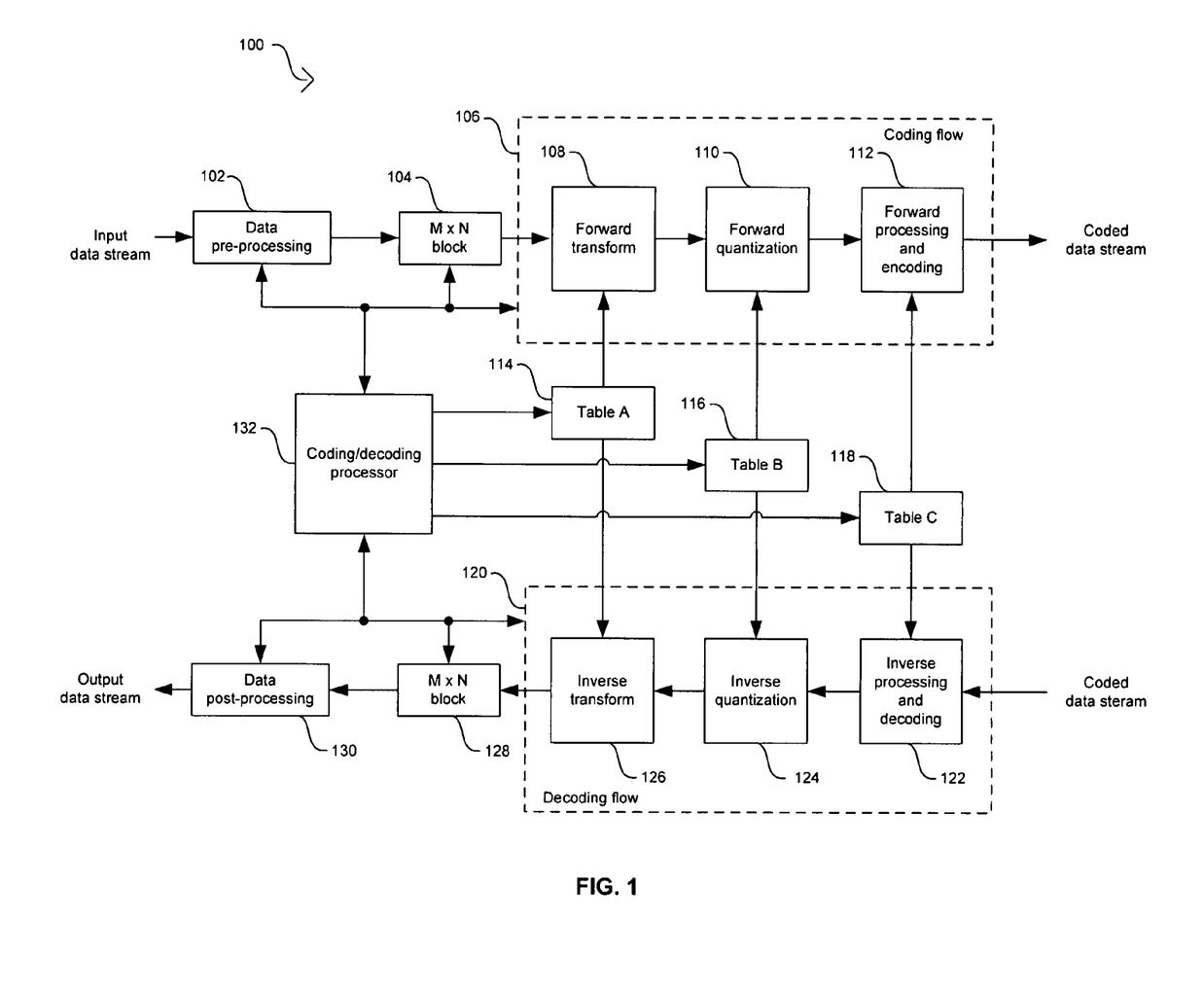
FIG. 1 is a block diagram of a data coding and decoding system that may be utilized in connection with an embodiment of the invention.

FIG. 1 is a block diagram of a data coding and decoding system that may be utilized in connection with an embodiment of the invention. Referring to FIG. 1, an exemplary data coding and decoding system 100 may comprise a data pre-processing block 102, an M×N block unit 104, a coding flow block 106, a table A 114, a table B 116, a table C 118, a decoding flow block 120, an M×N block unit 128, a data post-processing block 130, and a coding/decoding processor 132. The coding flow block 106 may comprise a forward transform block 108, a forward quantization block 110, and a forward processing and encoding block 112. The decoding flow block 120 may comprise an inverse transform block 126, an inverse quantization block 124, and an inverse processing and decoding block 122.

The data pre-processing block 102 and the data post-processing block 128 may comprise suitable logic, circuitry, and/or code that may enable manipulating and/or modifying input data and output data respectively. The M×N blocks 104 and 126 may comprise suitable logic, circuitry, and/or code that may enable selecting M×N arrays of data points from the data stream, where M×N may represent, but is not limited to, for example, 4×4, 8×4, 4×8, and 8×8 arrays of points. For example, the coding/decoding processor 132 may be utilized to indicate to the M×N blocks 104 and 126 which array size to select during operation.

The forward transform block 108 and the inverse transform block 126 may comprise suitable logic, circuitry, and/or code that may enable implementing a forward transform operation and an inverse transform operation respectively. The forward transform operation may be, for example, a DCT operation and the inverse transform operation may be, for example, an IDCT operation. The forward transform operation may convert data domain samples into transform domain samples. The inverse transform operation may convert transform domain samples into data domain samples. The table A 114 may comprise suitable logic, circuitry, and/or code that may enable storing a plurality of matrix coefficients to be utilized by the forward transform block 108 and/or the inverse transform block 126. In another embodiment, the forward transform block 108 and the inverse transform block 126 may each utilize a separate table of matrix coefficients. The table A 114, or separate tables when separate tables are utilized, may correspond to a portion of a system memory and/or local memory that may be utilized to store a plurality of information that may be utilized by the data coding and decoding system 100.

The forward quantization block 110 and the inverse quantization block 124 may comprise suitable logic, circuitry, and/or code that may enable providing forward quantization and inverse quantization respectively based on the quantization table contained in table B 116. The table B 116 may comprise suitable logic, circuitry, and/or code that may enable storing a plurality of matrix coefficients to be utilized by the forward quantization block 110 and/or the inverse quantization block 124. In another embodiment, the forward quantization block 110 and the inverse quantization block 124 may each utilize a separate table of matrix coefficients. The table B 116, or separate tables when separate tables are utilized, may correspond to a portion of a system memory and/or local memory that may be utilized to store a plurality of information that may be utilized by the data coding and decoding system 100.

The forward processing and encoding block 112 and the inverse processing and decoding block 122 may comprise suitable logic, circuitry, and/or code that may enable providing forward processing and encoding and inverse processing and decoding respectively based on the contents in table C 118. The forward encoding and inverse encoding may be, for example, entropy encoding and entropy decoding respectively. The table C 118 may comprise suitable logic, circuitry, and/or code that may enable storing a plurality of parameters and/or values to be utilized by the forward processing and encoding block 112 and/or the inverse processing and decoding block 122. In another embodiment, the forward processing and encoding block 112 and the inverse processing and decoding block 122 may each utilize a separate table of matrix coefficients. The table C 118, or separate tables when separate tables are utilized, may correspond to a portion of a system memory and/or local memory that may be utilized to store a plurality of information that may be utilized by the data coding and decoding system 100.

The coding/decoding processor 132 may comprise suitable logic, circuitry, and/or code that may enable updating, modifying, and controlling the contents and operation of coding flow block 106, the decoding flow block 120, the data pre-processing block 102, the M×N blocks 104 and 128, the data post-processing block 130, the table A 114, the table B 116, and/or the table C 118.

In some instances, at least a portion of the operations of the data coding and decoding system 100 in FIG. 1 may be performed by at least one processor, wherein the processor may be a central processing unit (CPU) and/or a digital signal processor (DSP), an application specific integrated circuit (ASIC), or a programmable device such as a field programmable gate array (FPGA) or a complex programmable logic device (CPLD). The data coding portion and the data decoding portion of the data coding and decoding system 100 may be performed by separate devices. Some devices may perform both the data coding portion and the data decoding portion while other devices may only perform the data decoding portion. Moreover, separate devices may be located in distinct locations.

In an example of the operation of the data coding and decoding system 100, the M×N blocks 104 and 128 may be 8×8 transform blocks that may be utilized to illustrate various exemplary steps for implementing high fidelity IDCT and DCT algorithms. However, other size transforms, that is, transforms with either 4 or 8 points in one the transform dimensions, for example, 4×4, 8×4 and 4×8, may also be utilized without departing from the various aspects of the method and system for high fidelity IDCT and DCT algorithms. When different size transforms are utilized, the specific number of required bits may have to be adjusted accordingly.

In the illustrative example, an inverse transform operation may be a two-dimensional (2D) 8×8 IDCT algorithm that may be performed in the inverse transform block 126 and may be expressed in the form of a matrix multiplication as:

$$(x_{ij})_{8\times 8} = A'^{*}(y_{ij})_{8\times 8}{}^{*}A, \quad (1)$$

where A is an ideal or infinite precision 8×8 transform matrix that may be expressed by the following matrix:

$$A(a_{ij})_{8\times 8} = \begin{bmatrix} a & a & a & a & a & a & a & a \\ b & d & e & g & -g & -e & -d & -b \\ c & f & -f & -c & -c & -f & f & c \\ d & -g & -b & -e & e & b & g & -d \\ a & -a & -a & a & a & -a & -a & a \\ e & -b & g & d & -d & -g & b & -e \\ f & -c & c & -f & -f & c & -c & f \\ g & -e & d & -b & b & -e & -d & -g \end{bmatrix}, \quad (2)$$

and where $a_{ij}$ is the $j^{th}$ element of the $i^{th}$ row vector of A, A' is the transpose of A, $(x_{ij})_{8\times 8}$ is an output matrix of the inverse transform operation that comprises data domain samples, $(y_{ij})_{8\times 8}$ is an input matrix to the inverse transform operation that comprises transform domain samples, and the transform coefficients for A and A', which for an IDCT may correspond to a plurality of cosine coefficients, are given as follows:

$$\begin{pmatrix} a \\ b \\ c \\ d \\ e \\ f \\ g \end{pmatrix} = \frac{1}{2} \begin{pmatrix} \cos(\pi/4) \\ \cos(\pi/16) \\ \cos(\pi/8) \\ \cos(3*\pi/16) \\ \cos(5*\pi/16) \\ \cos(3*\pi/8) \\ \cos(7*\pi/16) \end{pmatrix}. \quad (3)$$

By properly scaling the coefficients in Equation (3), the number of multiplications involved in IDCT transforms in the inverse transform block 126 may be reduced. In this regard, the ideal transform matrix, A, may be scaled as follows:

$$T = \sqrt{2}A. \quad (4)$$

Based on Equation (4), the 2D 8×8 IDCT operation in Equation (1) may be expressed as:

$$(x_{ij})_{8\times 8} = \frac{1}{2} * T' * (y_{ij})_{8\times 8} * T, \quad (5)$$

where T' is the transpose of T.

The scaled ideal transform matrix, T, may be expressed in the following matrix representation:

$$T(t_{ij})_{8\times 8} = \begin{bmatrix} a & a & a & a & a & a & a & a \\ b & d & e & g & -g & -e & -d & -b \\ c & f & -f & -c & -c & -f & f & c \\ d & -g & -b & -e & e & b & g & -d \\ a & -a & -a & a & a & -a & -a & a \\ e & -b & g & d & -d & -g & b & -e \\ f & -c & c & -f & -f & c & -c & f \\ g & -e & d & -b & b & -e & -d & -g \end{bmatrix}, \quad (6)$$

where $t_{ij}$ is the $j^{th}$ element of the $j^{th}$ row vector of T, and the transform coefficients are given by:

$$\begin{pmatrix} a \\ b \\ c \\ d \\ e \\ f \\ g \end{pmatrix} = \begin{pmatrix} \frac{1}{2} \\ \frac{\sqrt{2}}{2}\cos(\pi/16) \\ \frac{\sqrt{2}}{2}\cos(\pi/8) \\ \frac{\sqrt{2}}{2}\cos(3*\pi/16) \\ \frac{\sqrt{2}}{2}\cos(5*\pi/16) \\ \frac{\sqrt{2}}{2}\cos(3*\pi/8) \\ \frac{\sqrt{2}}{2}\cos(7*\pi/16) \end{pmatrix}. \quad (7)$$

Since the transform coefficients of the scaled ideal transform matrix, T, have infinite precision, practical systems may require that a finite precision representation of the transform coefficients be implemented. In some instances, an efficient finite precision implementation of the scaled ideal transform matrix, T, may require a decomposition into a plurality of smaller finite precision transform operations. The overall effect of these smaller finite precision transform operations is to provide an effective transform matrix of finite precision that is representative of the scaled ideal transform matrix, T. The higher the precision, that is, in general, the higher the number of bits in the coefficients of this effective transform matrix, the higher the accuracy or fidelity of the reconstruction provided by the transform operation.

In this regard, the transform coefficients a through g in Equation (7) may be expressed as finite precision values that are based on the sum of a main value of a certain fixed-bit width and a residue component. For example, for the transform coefficient a, the finite precision representation may be:

$$a = a_0 + \delta_a, \quad (8a)$$

where a is the infinite precision transform coefficient, $a_0$ is the fixed-bit width or finite precision main value, and $\delta_a$ is the residue component. A similar approach may be followed for the remaining transform coefficients in Equation (7). The scaled ideal transform matrix, T, may then be expressed as:

$$T = T_0 + \Delta = T_0 + (\delta_{ij})_{8\times 8}, \quad (8b)$$

where $T_0$ is an 8×8 effective transform matrix that comprises the main values of the transform coefficients in Equation (7), and $\Delta = (\delta_{ij})_{8\times 8}$ is an 8×8 matrix that comprises the residue components of the transform coefficients in Equation (7). The effective transform matrix, $T_0$, may be expressed in matrix form by:

$$T(t_{ij})_{8\times 8} = \begin{bmatrix} a_0 & a_0 & a_0 & a_0 & a_0 & a_0 & a_0 & a_0 \\ b_0 & d_0 & e_0 & g_0 & -g_0 & -e_0 & -d_0 & -b_0 \\ c_0 & f_0 & -f_0 & -c_0 & -c_0 & -f_0 & f_0 & c_0 \\ d_0 & -g_0 & -b_0 & -e_0 & e_0 & b_0 & g_0 & -d_0 \\ a_0 & -a_0 & -a_0 & a_0 & a_0 & -a_0 & -a_0 & a_0 \\ e_0 & -b_0 & g_0 & d_0 & -d_0 & -g_0 & b_0 & -e_0 \\ f_0 & -c_0 & c_0 & -f_0 & -f_0 & c_0 & -c_0 & f_0 \\ g_0 & -e_0 & d_0 & -b_0 & b_0 & -e_0 & -d_0 & -g_0 \end{bmatrix}, \quad (9)$$

where $t_{ij}^0$ is the $j^{th}$ element of the $i^{th}$ row vector of $T_0$, and $a_0$ through $g_0$ correspond to the finite precision main values of the transform coefficients a through g, respectively, in Equation (7).

In some instances, to provide compatibility with various other finite precision implementations, it may be necessary to specify the accuracy of the finite precision coefficients in the effective transform matrix, $T_0$, in terms of a portion of most significant bits (MSBs) or in terms of properly rounded R number of bits within an upper bound from a high resolution, finite precision representation of the ideal transform matrix coefficients. In this regard, the high resolution, finite precision representation of the ideal transform matrix coefficients correspond to a reference transform coefficient and the predetermined number of MSBs or rounded bits provides a specified reconstruction accuracy and fidelity for the transform operation. This approach may overcome the rigidity of integer transforms and the inaccuracies of statistical transform definitions.

Alternatively, each of the transform coefficients in the effective transform matrix, $T_0$, may correspond to the sum of a corresponding reference transform coefficient, an offset value, and a set of less significant bits, such that the sum of the offset value and the less significant bits may be either positive or negative polarity and its magnitude may be bounded by the design constraints of the system. The sum of the offset value and the less significant bits corresponds to the residue associated with that coefficient value. The offset value may be, for example, a negative value whose magnitude is equivalent to the value of a '1'-bit in the place of the least significant of the MSBs. In some applications, the minimum number of MSBs that may be selected or predetermined from each reference transform coefficient to implement a corresponding finite precision coefficient in the effective transform matrix, $T_0$, may be distinct for each reference transform coefficient.

Referring to the inverse transform operation described in Equation (1), the input and output matrices may be expressed as $Y=(y_{ij})_{8\times 8}$ and $X=(x_{ij})_{8\times 8}$. When the effective transform matrix, $T_0$, is utilized, Equation (1) may be expressed as:

$$X_0 = (x_{ij}^0)_{8\times 8} = \frac{1}{2} * T_0' * (y_{ij})_{8\times 8} * T_0 = \frac{1}{2} * T_0' * Y * T_0, \quad (10)$$

where $X_0=(x_{ij}^0)_{8\times 8}$ is the finite precision representation of $X=(x_{ij})_{8\times 8}$ that results from the IDCT operation of Y when utilizing the finite precision coefficients in the effective transform matrix, $T_0$. The transform operation in Equation (10) may be implemented by utilizing two one-dimensional (1D) IDCT transform operations, for example. In this regard, a first 1D IDCT transform operation may be a row transform represented by the intermediate result $Y*T_0=Z_0$ in Equation (10) and may be expressed as:

$$Z_0=(z_{ij}^0)_{8\times 8}=(y_{ij})_{8\times 8}*T_0, \quad (11)$$

where $Z_0=(z_{ij}^0)_{8\times 8}$ is an 8×8 matrix of finite precision intermediate values and $z_{ij}^0$ is the $j^{th}$ element of the $i^{th}$ row vector of $Z_0$. The value of $z_{ij}^0$ may be expanded as follows:

$$z_{ij}^0 = \sum_{k=0}^{7} y_{ik} t_{kj}^0 \quad (12)$$

$$= \sum_{k=0}^{7} y_{ik} t_{kj} + \sum_{k=0}^{7} y_{ik}(t_{kj}^0 - t_{kj}),$$

$$= z_{ij} + \Delta_{ij}$$

where the term $$z_{ij} = \sum_{k=0}^{7} y_{ik} t_{kj}$$

corresponds to the ideal or infinite 1D IDCT operation that results in the intermediate value $Y*T$, where T is the scaled ideal transform matrix, and $$\Delta_{ij} = \sum_{k=0}^{7} y_{ik}(t_{kj}^0 - t_{kj}) = -\sum_{k=0}^{7} y_{ik}\delta_{kj}, \quad (13)$$

corresponds to the residue components between the infinite precision or ideal term, $z_{ij}$ and the finite precision term, $z_{ij}^0$.

After performing the first 1D IDCT operation, a second 1D IDCT operation may be a column transform operation that results from the matrix multiplication $T_0'*Z_0$ to obtain:

$$2 * x_{ij}^0 = \sum_{k=0}^{7} t_{ki}^0 z_{kj}^0 \quad (14)$$

$$= \sum_{k=0}^{7} t_{ki}^0 z_{kj} + \sum_{k=0}^{7} t_{ki}^0 \Delta_{kj}$$

$$= \sum_{k=0}^{7} t_{ki} z_{kj} + \sum_{k=0}^{7} (t_{ki}^0 - t_{ki}) z_{kj} + \sum_{k=0}^{7} t_{ki}^0 \Delta_{kj}$$

$$= 2 * x_{ij} - \sum_{k=0}^{7} \delta_{ki} z_{kj} + \sum_{k=0}^{7} t_{ki}^0 \Delta_{kj}$$

where $x_{ij}$ corresponds to the high resolution, infinite, or ideal data coefficients of the output matrix of the 2D inverse transform operation.

As a result of the separate 1D transform analysis of the 2D IDCT operation, when requiring that $$\max_{i,j=0,1\ldots 7} |2*x_{ij} - 2*x_{ij}^0| < 1, \text{ or} \quad (15)$$

$$\max_{i,j=0,1\ldots 7} |x_{ij} - x_{ij}^0| < \frac{1}{2}, \quad (16)$$

the closely matched 8×8 inverse transform (IDCT) integer values that may be achieved when using the effective transform matrix, $T_0$, as the 8×8 transform in Equation (10) may also be achieved when using the scaled ideal transform matrix, T, as the 8×8 transform in Equation (5). In this regard, the closely matched integer values may be achieved when the results are rounded to the nearest integer with rounding away from the zero of half integer values, for example. When a mismatch occurs, the difference may be upper-bounded by 1. The right hand side of the condition in Equation (16) may be relaxed to be 1 and the same property stated above may still hold. However, because data range may overflow in a 1D transform, ½ may be a more appropriate value to guarantee the upper bound of 1 even for those instances when overflow ing does occur. Satisfying Equation (15) and Equation (16) may require that:

$$\max_{i,j=0,1\ldots 7}\left|-\sum_{k=0}^{7}\delta_{ki}z_{kj}+\sum_{k=0}^{7}t_{ki}^{0}\Delta_{kj}\right|<1. \quad (17)$$

The condition in Equation (17) may be satisfied when, $$\max_{i,j=0,1\ldots 7}\left|-\sum_{k=0}^{7}\delta_{ki}z_{kj}\right|+\max_{i,j=0,1\ldots 7}\left|\sum_{k=0}^{7}t_{ki}^{0}\Delta_{kj}\right|<1. \quad (18)$$

The condition in Equation (18) may be satisfied when the following two conditions are satisfied:

$$\max_{i,j=0,1\ldots 7}\left|-\sum_{k=0}^{7}\delta_{ki}z_{kj}\right|<1-0.881992, \text{ and} \quad (19a)$$

$$\max_{i,j=0,1\ldots 7}\left|\sum_{k=0}^{7}t_{ki}^{0}\Delta_{kj}\right|\leq 0.881992. \quad (19b)$$

Moreover, the condition in Equation (19b) may be satisfied when the following two additional conditions are also satisfied:

$$\max_{i,j=0,1\ldots 7}|\Delta_{ij}|<0.2360161, \text{ and} \quad (20a)$$

$$\max_{i=0,1\ldots 7}\sum_{k=0}^{7}|t_{ki}^{0}|<3.737. \quad (20b)$$

In accordance with Equation (13), the condition in Equation (20a) may be equivalent to:

$$\max_{i,j=0,1\ldots 7}\left|-\sum_{k=0}^{7}y_{ik}\delta_{kj}\right|\leq 0.2360161. \quad (21)$$

When the output matrix Y comprises transform domain samples of finite precision such as 12-bit signed values in the range of −2048 to 2047, for example, the condition in Equation (21) may be satisfied when:

$$\max_{i,j=0,1\ldots 7}|\delta_{ij}|\leq 0.2360161*\frac{1}{2^{11}}*\frac{1}{8}=\frac{1}{9*2^{13}}<\frac{0.9440642}{2^{16}}. \quad (22)$$

When the intermediate result of the first ideal 1D IDCT, $$z_{ij}=\sum_{k=0}^{7}y_{ik}t_{kj},$$

ranges from −1024 to 1023, the condition in Equation (19a) may be satisfied when the following condition is met:

$$\max_{i,j=0,1\ldots 7}|\delta_{ij}|<(1-0.881992)*\frac{1}{2^{10}}*\frac{1}{8}<\frac{0.944064}{2^{16}}, \quad (23)$$

which may be a slightly stricter condition than that provided by Equation (22). In this regard, satisfying the condition in Equation (23) may also satisfy the condition in Equation (22).

When the conditions provided in Equations (20a), (20b) and (23) are satisfied, the 2D IDCT described in Equation (10) may result, when no rounding is applied, in values that are different from the theoretical 2D IDCT values by less than 0.5. When rounding is applied, both transforms may round to the same nearest integer values using rounding away from zero of half integer values, for example. In those instances when both transforms do not round to the same integer, the difference is 1.

In accordance with the condition in Equation (23), each of the transform coefficients in Equation (7) may differ from the corresponding transform coefficient in the scaled ideal transform matrix, T, by less than $0.944064/2^{16}$. The condition in Equation (21) may indicate the least amount of precision that may be required for the intermediate values that result from the 1D row transform operation. In this regard, the intermediate result or finite precision term, $z_{ij}^{0}$, may be rounded to have fewer bits, for example, where the rounded value of $z_{ij}^{0}$ may be denoted as $z_{ij}^{1}$. As a result of the conditions (12) and (20a), the following condition may be satisfied:

$$|z_{ij}^{1}-z_{ij}|\leq|z_{ij}^{1}-z_{ij}^{0}|+|z_{ij}^{0}-z_{ij}|\leq|z_{ij}^{1}-z_{ij}^{0}|+0.2360161. \quad (24)$$

The rounded value $z_{ij}^{1}$ may be selected to be close to the ideal value $z_{ij}$. For example, when $|z_{ij}^{1}-z_{ij}^{0}|\leq 1/32$, that is, when keeping at least 5 bits after the decimal point of $z_{ij}^{0}$, the approximate result $|z_{ij}^{1}-z_{ij}|\leq 0.2672661$ may be achieved. In some instances, as a result of visual quality considerations, more than five (5) bits may be kept. Fewer than five bits may be kept when implementation requirements may impose architectural limitations.

Moreover, the condition in Equation (20b) indicates that the sum of the absolute values in each column in the effective transform matrix, $T_0$, may not be higher than 3.737. In this regard, rounding of the transform coefficient may not violate the condition in Equation (20b).

The conditions provided in Equations (20a), (20b) and (23) may be satisfied by a plurality of sets of transform coefficients with finite precision main values. For example, a set of transform coefficients that comprises at least the 17 MSBs of a, b, . . . , and g in $a_0$, $b_0$, . . . , and $g_0$, respectively, may meet the above conditions. For a bit width of 16 bits, an exemplary set of finite precision main values that meets the condition in Equation (23) may be:

$$\begin{pmatrix}a_0\\b_0\\c_0\\d_0\\e_0\\f_0\\g_0\end{pmatrix}=\frac{1}{2^{16}}\begin{pmatrix}2^{15}\\45451\\42813\\38531\\25746\\17734\\9041\end{pmatrix}. \quad (25)$$

The following 15-bit set of coefficients may be the minimum-bit width, for the coefficients collectively, that may meet the condition in Equation (23):

$$\begin{pmatrix} a_0 \\ b_0 \\ c_0 \\ d_0 \\ e_0 \\ f_0 \\ g_0 \end{pmatrix} = \frac{1}{2^{15}} \begin{pmatrix} 2^{14} \\ 22725 \\ 21407 \\ 19266 \\ 12873 \\ 8867 \\ 4520 \end{pmatrix}. \quad (26)$$

In some instances, individual coefficients, such as $d_0$ and $g_0$, for example, may be implemented using fewer than 15 bits and still meet the condition in Equation (23). Further reduction of the bit width of the whole set of coefficients may result in violations of the constraints.

For 14-bit and 16-bit input transform domain samples to the 8×8 IDCT, the conditions that correspond to Equation (22) may be similarly derived. For example, for 14-bit transform domain samples as input data to the IDCT, the equivalent condition to Equation (22) may be:

$$\max_{i,j=0,1\ldots 7} |\delta_{ij}| < \frac{0.944064}{2^{18}}. \quad (27a)$$

In another example, for 16-bit transform domain samples as input data to the IDCT, the equivalent condition to Equation (22) may be:

$$\max_{i,j=0,1\ldots 7} |\delta_{ij}| < \frac{0.944064}{2^{20}}. \quad (27b)$$

The above analysis may assume that the input data to the 2D IDCT, that is, the transform domain samples, corresponds to the ideal or theoretical forward 8×8 DCT transformed data. For a finite precision implementation of a 2D IDCT this need not be the case. The ideal or theoretical forward 2D DCT is of infinite precision and may, in some instance, be well approximated with high fidelity by 64-bit floating-point calculations, for example. Differences to the ideal or theoretical transform domain samples may also result from the process of rounding to the nearest integer. In MPEG2 video bitstream coding and decoding operations, for example, the transform domain samples may also be quantized and inversed quantized, which makes the input data to the 2D IDCT further deviate from the ideal or theoretical values and may also cause overflowing, that is, the intermediate output data from the $1^{st}$ 1D IDCT may be out of range. In this regard, the precision of the intermediate values that result from the 1D row transform operation may be adjusted to be more precise than the minimum that results from the constraint in Equation (20a). Another approach to control any difference that may arise in the reconstructed data domain samples is to monitor drift issues by reserving enough intermediate data-bit width when utilizing a compliance bistream tester, for example. While the analysis to determine a minimum width for finite precision main values has been for an 8×8 effective transform matrix, a similar analysis may also be implemented for an effective transform matrix where at least one dimension may be four points, for example.

In the exemplary embodiment of the data coding and decoding system 100 illustrated in FIG. 1, the transform domain samples in Y may correspond to the output samples from the forward transform block 108. Likewise, assuming error-free quantization, encoding, decoding, and inverse quantization operations, the transform domain samples in Y may also correspond to the output of the inverse quantization block 124. The data domain samples in X may correspond to the input samples to the forward transform block 108 and also, again assuming error-free operations, to the output samples of the inverse transform block 126. The finite precision main values or transform coefficients of the effective transform matrix, $T_0$, such as those in Equations (25) and (26) may be stored in, for example, the table A 114 in FIG. 1 and may be transferred to the inverse transform block 126 in the decoding flow block 120 to perform the 2D IDCT algorithm. The 2D IDCT algorithm may be implemented in the inverse transform block 126 in a manner that may enable flexibility in operation. For example, the precision of the transform coefficients may be selected from a plurality of finite precision-bit widths as long as the necessary conditions are satisfied.

The inverse transform block 126 may support the implementation of the 2D IDCT algorithm using one of a single 2D operation and two separable 1D operations, for example. When the 2D implementation is selected, the data path-bit width may be larger for intermediate results when compared to the two separable 1D operations. When the implementation based on two separable 1D operations is selected, the order in which the row or horizontal data transforms and the column or vertical data transforms are performed may be flexible. In an exemplary embodiment of the inverse transform block 126, an 8×8 IDCT algorithm may be implemented by transforming the input data rows first and transforming the resulting columns second. In this regard, the intermediate data-bit width may be limited to be within 32 bits in order to provide a cost effective implementation. Moreover, the implementation of the 2D IDCT algorithm may utilize architectures that enable reducing the overall number of multiplication operations to be performed.

Figure 2:
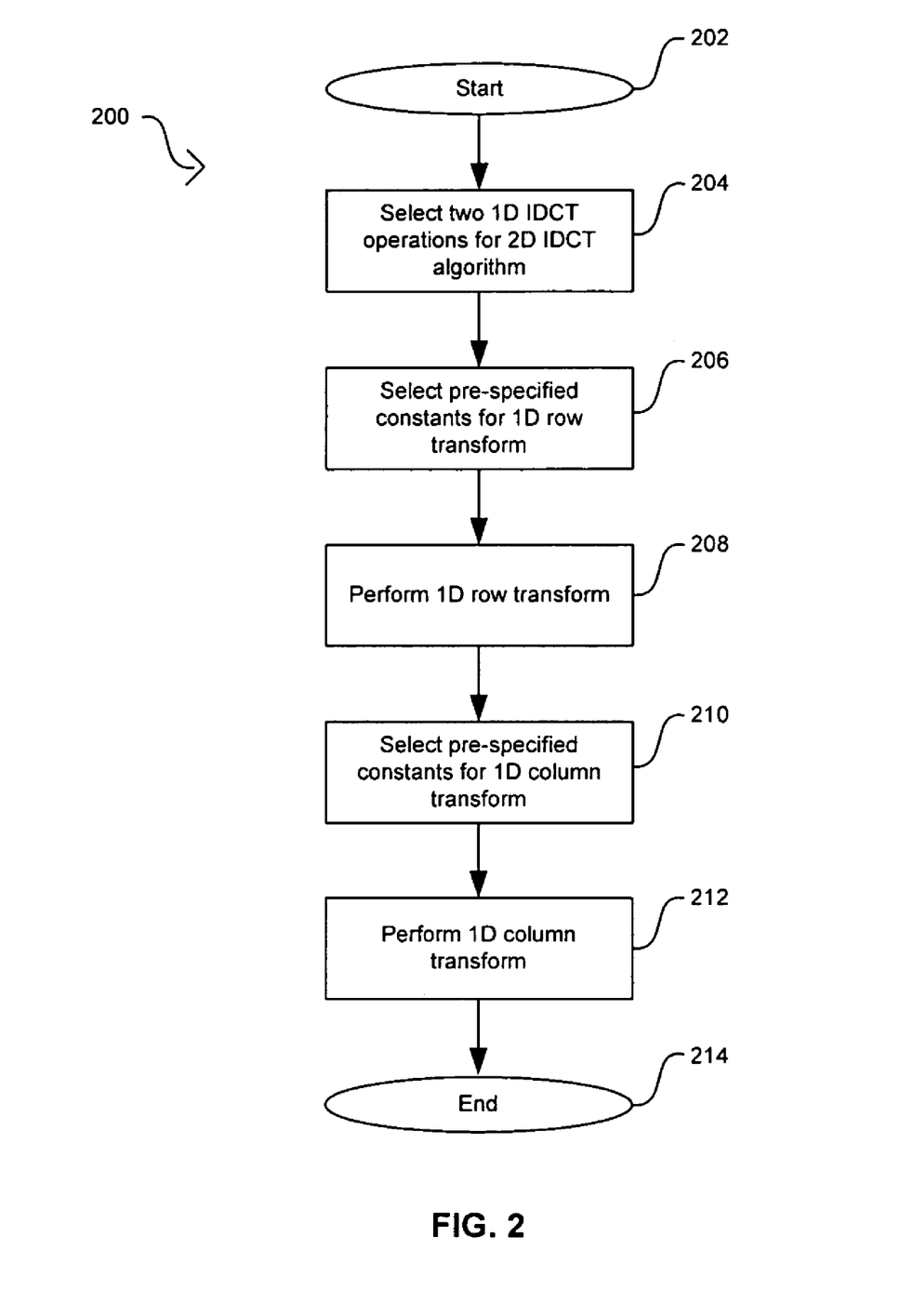
FIG. 2 is a flow chart illustrating exemplary steps for performing a 2D IDCT algorithm, in accordance with an embodiment of the invention.

FIG. 2 is a flow chart illustrating exemplary steps for performing a 2D IDCT algorithm, in accordance with an embodiment of the invention. Referring to FIG. 2, in step 204, after start step 202 of the flow chart 200, the coding/decoding processor 132 in FIG. 1 may be utilized to select between performing the 2D IDCT algorithm in the inverse transform block 126 based on a 2D transform operation or based on two separable 1D transform operations. In this regard, the inverse transform block 126 may utilize the two separable 1D transform operations in order to reconstruct the data domain samples. The first of the two separable 1D transform operations may be a 1D row transform while the second one may be a 1D column transform, for example.

In step 206, a plurality of pre-specified constants may be selected for performing the 1D row transform operation on the input matrix Y, $Y*T_0$. A shift left constant, such as SHIFTL, for example, may be specified to perform a left shift required by the value of the transform coefficients. In this regard, when the coefficients illustrated in Equation (26) are utilized, the value of the shift left constant may be SHIFTL=14, for example. A right shift constant, such as ROW_SHIFT, for example, may also be specified to right shift the results of the 1D row transform and therefore regulate the-bit width of the 1D row transform results. The value of the right shift constant may be ROW_SHIFT=10, when the coefficients illustrated in Equation (26) are utilized.

A data range constant, such as INTER_DATA_RANGE, for example, may also be specified to indicate the range of the 1D row transform results. The INTER_DATA_RANGE may be used to obtain a certain number of bits as the output of the 1D row transform. For example, when the coefficients in Equation (26) are utilized and ROW_SHIFT=10, the INTER_DATA_RANGE may equal to $2^{16}$, which means 17 MSBs, including the sign bit, may be retained from the 1D row transform results. For more precise intermediate results, for example, ROW_SHIFT may be set to 9, and INTER_DATA_RANGE may equal to $2^{17}$, resulting in 18 bits of the 1D row transform being retained. In another example, 16 MSBs, including the sign bit, may also be obtained from the 1D row transform results when ROW_SHIFT=11 and the INTER_DATA_RANGE=$2^{15}$.

In step 208, the inverse transform block 126 may perform the 1D row transform operation $Y*T_0$ and may store the results back in the matrix Y, for example. Exemplary pseudo-code of the 1D row transform operation performed by the inverse transform block 126 may be as follows:

```
int Y[8][8];
int rnd = (1<<(ROW_SHIFT-1));
int x, y, x0, x1, x2, x4;
int z0, z1, z2, z3, w0, w1, w2, w3;
for (y=0; y<8; y++)
{
    x0 = (Y[y][0]+Y[y][4])<<SHIFTL;
    x1 = (Y[y][0]-Y[y][4])<<SHIFTL;
    x2 = Y[y][2]*c + Y[y][6]*f;
    x4 = Y[y][2]*f - Y[y][6]*c;
    z0 = x0+x2;
    z1 = x1+x4;
    z2 = x1-x4;
    z3 = x0-x2;
    w0 = Y[y][1]*b + Y[y][3]*d + Y[y][5]*e + Y[y][7]*g;
    w1 = Y[y][1]*d - Y[y][3]*g - Y[y][5]*b - Y[y][7]*e;
    w2 = Y[y][1]*e - Y[y][3]*b + Y[y][5]*g + Y[y][7]*d;
    w3 = Y[y][1]*g - Y[y][3]*e + Y[y][5]*d - Y[y][7]*b;
    Y[y][0] = z0+w0;
    Y[y][1] = z1+w1;
    Y[y][2] = z2+w2;
    Y[y][3] = z3+w3;
    Y[y][4] = z3-w3;
    Y[y][5] = z2-w2;
    Y[y][6] = z1-w1;
    Y[y][7] = z0-w0;
    for (x=0;x<8;x++)
    {
        Y[y][x]= ((Y[y][x]+rnd)>>ROW_SHIFT);
        Y[y][x]= (Y[y][x] = clip3(-INTER_DATA_RANGE,
             INTER_DATA_RANGE-1, Y[y][x]);
    }
},
``` where the variables x1, x1, x2, x4, z0, z1, z2, z3, w0, w1, w2, and w3 may be utilized to store intermediate results and the pre-specified constants ROW_SHIFT and INTER_DATA_RANGE may be utilized for rounding the 1D row transform results and for obtaining the specified-bit width from the rounded 1D row transform results respectively. The function clip3( ) may be specified as $$clip3(y, z, x) = \begin{cases} y, & \text{if } x < y \\ z, & \text{if } x > z. \\ x, & \text{otherise} \end{cases}$$

In step 210, a plurality of pre-specified constants may be selected for performing the 1D column transform $T_0 = *Y$. A shift right constant, such as SS, for example, may be specified to right shift the intermediate multiplication results. The SS constant may be utilized to prevent the sum of the products from exceeding a 32-bit range when a 32-bit implementation is utilized, for example. Having the value of SS=3 may be sufficient to prevent the sum of the products from exceeding the 32-bit range when the coefficients specified in Equation (26) are utilized. The output values of the 1D column transform operation may not be very sensitive to the value of SS as long as SS is not too large. For example, when SS=5 and SS=3 the results for 12-bit input data may be very similar.

A column shift constant, such as COL_SHIFT, for example, may be specified to right shift the results of the 1D column transform operation. The value of COL_SHIFT may be based on the set of transform coefficients to be utilized and on the value of ROW_SHIFT. In an exemplary embodiment of the inverse transform block 126, when the transform coefficients in Equation (26) are utilized, the value of COL_SHIFT=22 for ROW_SHIFT=9 or COL_SHIFT=21 for ROW_SHIFT=10 or COL_SHIFT=20 for ROW_SHIFT=11.

A data range constant, such as IDCT_DATA_RANGE, for example, may be specified to indicate a range of values for the results of the 1D column transform. For example, when 12-bit input data is utilized, the data range may be IDCT_DATA_RANGE=256. In this regard, the IDCT_DATA_RANGE pre-specified constant may be utilized to clip the final data range to from −256 to 255, inclusive.

In step 212, the inverse transform block 126 may perform the 1D column transform operation $T_0'*Y$ and may store the results back in the matrix Y, for example. Exemplary pseudo-code of the 1D column transform operation performed by the inverse transform block 126 may be as follows:

```
int rnd = (1<<(COL_SHIFT-1-SS));
int x,y, x0, x1, x2, x4;
int z0, z1, z2, z3, w0, w1, w2, w3;
for (x=0; x<8; x++)
{
    w0 = Y[0][x]<<(SHIFTL-SS);
    w1 = Y[4][x]<<(SHIFTL-SS);
    x0 = w0 + w1;
    x1 = w0 - w1;
    w0 = (Y[2][x]*c)>>SS;
    w1 = (Y[6][x]*f)>>SS;
    x2 = w0 + w1;
    w0 = (Y[2][x]*f)>>SS;
    w1 = (Y[6][x]*c)>>SS;
    x4 = w0 - w1;
    w0=   ((Y[1][x]*b)>>SS)    +
        ((Y[3][x]*d)>>SS)+((Y[5][x]*e)>>SS)    +
        ((Y[7][x]*g)>>SS);
    w1=   ((Y[1][x]*d)>>SS)    -    ((Y[3][x]*g)>>SS)    -
        ((Y[5][x]*b)>>SS)    - ((Y[7][x]*e)>>SS);
    w2=((Y[1][x]*e)>>SS)    -    ((Y[3][x]*b)>>SS)    +
        ((Y[5][x]*g)>>SS)    + ((Y[7][x]*d)>>SS);
    w3=((Y[1][x]*g)>>SS)    -    ((Y[3][x]*e)>>SS)    +
        ((Y[5][x]*d)>>SS)    - ((Y[7][x]*b)>>SS);
    z0 = x0+x2;
    z1 = x1+x4;
    z2 = x1-x4;
    z3 = x0-x2;
    Y[0][x] = z0+w0;
    Y[1][x] = z1+w1;
    Y[2][x] = z2+w2;
    Y[3][x] = z3+w3;
    Y[4][x] = z3-w3;
    Y[5][x] = z2-w2;
    Y[6][x] = z1-w1;
    Y[7][x] = z0-w0;
    for (y=0;y<8;y++)
    {
        Y[y][x] = ((Y[y][x]+rnd)>>(COL_SHIFT-SS));
        Y[y][x] =
           clip3(-IDCT_DATA_RANGE, IDCT_DATA_RANGE-1,
```

-continued

```
    Y[y][x]);
  }
},
``` where the variables x0, x1, x2, x4, z0, z1, z2, z3, w0, w1, w2, and w3 may be utilized to store intermediate results and the pre-specified constants COL_SHIFT and IDCT_DATA_RANGE may be utilized for rounding the 1D column transform results and for obtaining the specified-bit width from the rounded 1D column transform results respectively.

Notwithstanding the IDCT pseudo-code describing the 1D row transform operation and the 1D column transform operation, the IDCT need not be so limited. For example, in some instances, a Fast IDCT implementation may be utilized. In this regard, the transform coefficients utilized in a Fast IDCT implementation may be determined in a similar manner as for the IDCT implementation described in steps 208 and 212.

In an exemplary embodiment of the inverse transform block 126, the 2D IDCT algorithm may be implemented by utilizing 32-bit operations. When the finite precision main values of the transform coefficients a through g in Equation (26) are utilized, specifying ROW_SHIFT=10 and retaining 17 bits of the output values of the 1D row transform operation may facilitate 32-bit operations, for example. Specifying ROW_SHIFT=11 and retaining 16 bits of the output values of the 1D row transform may enable the input to the $2^{nd}$ 1D transform to be 16 bits, for example. Both ROW_SHIFT=10 and ROW_SHIFT=11 may satisfy the requirements specified in ISO/IEC 23002-1. While ROW_SHIFT=11 may produce subtle artifacts that may be visible when zoomed in, utilizing ROW_SHIFT=11 may enable the operands of the 1D column transform to be 16 bits, for example. Moreover, the number of multiplications that may be needed for the 1D transform operations may be reduced by using some fast algorithms.

Figure 3:
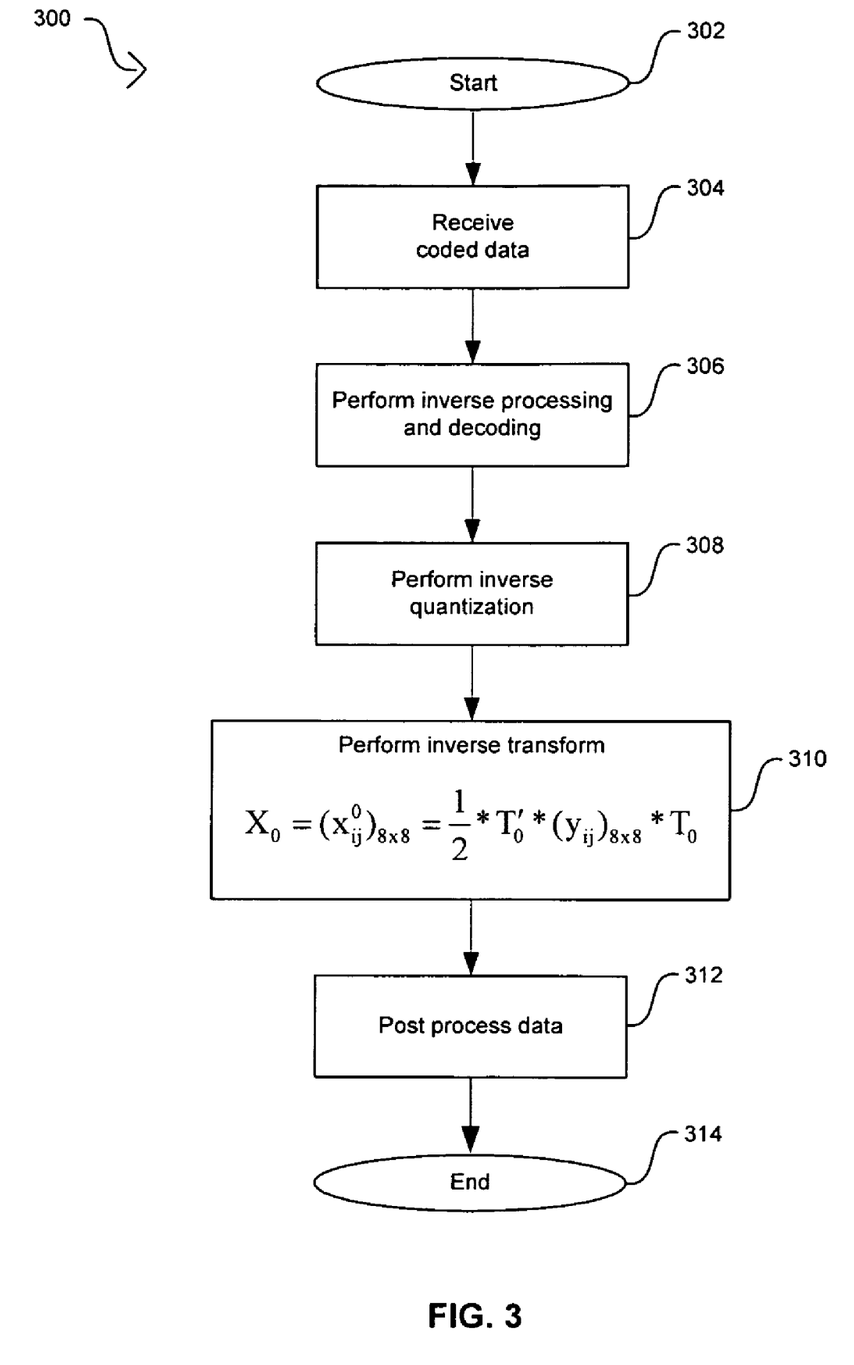
FIG. 3 is a flow chart illustrating exemplary steps that may be utilized during an M×N IDCT algorithm based on a minimum number of R bits for the transform coefficients in the effective transform matrix, in accordance with an embodiment of the invention.

FIG. 3 is a flow chart illustrating exemplary steps that may be utilized during an M×N IDCT algorithm based on a minimum number of R bits for the transform coefficients in the effective transform matrix, in accordance with an embodiment of the invention. Referring to FIG. 3, after start step 302, the decoding flow chart 300 may begin by having the decoding flow block 120 receive the coded data in step 304. The inverse processing and decoding block 122 may process the coded data received in step 306. In step 308, the inverse quantization block 126 may process the output data from step 306.

Following the inverse quantization operation in step 308, a 2D IDCT algorithm may be applied to the inverse quantized image data in step 310. The illustrative M×N transform matrix in step 310 may be defined by a plurality of finite precision main values of transform coefficients that satisfy or approximately satisfy the conditions provided in Equations (20a), (20b) and/or (21), for example. In this regard, the 2D IDCT algorithm may require the implementation of the operation described in Equation (10), for example. The transform coefficients in Equations (25) and (26) may be illustrative of the transform coefficients that may be utilized in an effective transform matrix, $T_0$, to perform the 2D IDCT algorithm described in Equation (10). The finite precision main values $a_0, b_0, \ldots$ and $g_0$ in $T_0$ may correspond to at least R bits of the reference transform coefficients a, b . . . and g, where the value of R may be based on the conditions provided in Equations (20a), (20b) and/or (21), for example, and/or on the size of the input data. A post-processing of the reconstructed data domain samples in step 312 may follow step 310. After post-processing, the flow diagram 310 may proceed to end step 314.

In the illustrative example of FIG. 1, a forward transform operation may be a 2D 8×8 DCT algorithm that may be performed in the forward transform block 108 and may be expressed in the form of a matrix multiplication as $$(y_{ij})_{8\times 8} = \frac{1}{2} * T * (x_{ij})_{8\times 8} * T', \tag{28}$$

where T is the scaled ideal transform matrix, T' is the transpose of T, $(x_{ij})_{8\times 8}$ is an input matrix of the forward transform operation that comprises data domain samples, and $(y_{ij})_{8\times 8}$ is an output matrix to the forward transform operation that comprises transform domain samples.

Referring to the forward transform operation described in Equation (28), the input and output matrices may be expressed as $X=(x_{ij})_{8\times 8}$ and $Y=(y_{ij})_{8\times 8}$. When the effective transform matrix, $T_0$, is utilized, Equation (28) may be expressed as:

$$Y_0 = (y_{ij}^0)_{8\times 8} = \frac{1}{2} * T_0 * (x_{ij})_{8\times 8} * T_0', \tag{29}$$

where $Y_0$ is the finite precision representation of $Y=(y_{ij})_{8\times 8}$ that results from the DCT operation of X when utilizing the finite precision coefficients in the effective transform matrix, $T_0$. The transform operation in Equation (29) may be implemented by utilizing two one-dimensional (1D) DCT transform operations, for example. In this regard, a first 1D DCT transform operation may be a row transform represented by the intermediate result $Z_0=X*T$, in Equation (29) and may be expressed as:

$$z_0=(z_{ij}^0)_{8\times 8}=(x_{ij})_{8\times 8}*T_0' \tag{30}$$

where $Z_0=(z_{ij}^0)_{8\times 8}$ is an 8×8 matrix of finite precision intermediate values and $z_{ij}^0$ is the $j^{th}$ element of the $i^{th}$ row vector of $Z_0$. The value of $z_{ij}^0$ may be expanded as follows:

$$\begin{aligned} z_{ij}^0 &= \sum_{k=0}^{7} x_{ik} t_{jk}^0 \\ &= \sum_{k=0}^{7} x_{ik} t_{jk} + \sum_{k=0}^{7} x_{ik}(t_{jk}^0 - t_{jk}), \\ &= z_{ij} + \Delta_{ij} \end{aligned} \tag{31}$$

where the term $$z_{ij} = \sum_{k=0}^{7} x_{ik} t_{jk}$$

corresponds to the ideal or infinite 1D DCT operation that results in the intermediate value X*T, where T is the scaled ideal transform matrix, and $$\Delta_{ij} = \sum_{k=0}^{7} x_{ik}(t_{jk}^0 - t_{jk}) = -\sum_{k=0}^{7} x_{ik}\delta_{jk}, \quad (32)$$

corresponds to the residue components between the infinite precision or ideal term, $z_{ij}$, and the finite precision term, $z_{ij}^0$.

After performing the first 1D DCT operation, a second 1D DCT operation may be a column transform operation that results from the matrix multiplication $T_0*Z_0$ to obtain:

$$2*y_{ij}^0 = \sum_{k=0}^{7} t_{ik}^0 z_{kj}^0 \quad (33)$$

$$= \sum_{k=0}^{7} t_{ik}^0 z_{kj} + \sum_{k=0}^{7} t_{ik}^0 \Delta_{kj}$$

$$= \sum_{k=0}^{7} t_{ik} z_{kj} + \sum_{k=0}^{7} (t_{ik}^0 - t_{ik})z_{kj} + \sum_{k=0}^{7} t_{ik}^0 \Delta_{kj}$$

$$= 2*y_{ij} - \sum_{k=0}^{7} \delta_{ik} z_{kj} + \sum_{k=0}^{7} t_{ik}^0 \Delta_{kj},$$

where $x_{ij}$ corresponds to the high resolution, infinite, or ideal data coefficients of the output matrix of the 2D inverse transform operation.

Following a similar approach as the exemplary approach described for the IDCT algorithm, the forward transformation that results when utilizing the effective transform matrix, $T_0$, as described in Equation (29), may differ from the corresponding values that result when the scaled ideal transform matrix, T, as described in Equation (28), by less than 0.5, that is, $|y_{ij}^0 - y_{ij}| < 0.5$, when the following conditions are satisfied:

$$\max_{i,j=0,1\ldots 7} |\Delta_{ij}| < \frac{1}{8}, \quad (34)$$

$$\max_{i,j=0,1\ldots 7} |\delta_{ij}| < \frac{1}{2^{14}}, \text{ and} \quad (35)$$

$$\max_{i=0,1\ldots 7} \sum_{k=0}^{7} |t_{ik}^0| \leq 4. \quad (36)$$

When rounding to the nearest integer by rounding away from zero of half integer values, the effective transform matrix and the scaled ideal transform matrix may result in closely matched integer values with an upper bound of 1 if a mismatch occurs. The conditions or constraints in Equations (34), (35), and (36) may be relaxed by requiring that $|y_{ij}^0 - y_{ij}| < 1$, however, requiring that $|y_{ij}^0 - y_{ij}^1| < 0.5$ may provide more closely matched results.

The conditions provided in Equations (34), (35) and (36) may be satisfied by a plurality of sets of transform coefficients with finite precision main values. For example, a set of transform coefficients that comprises at least the 14 MSBs of a, b, ..., and g in $a_0$, $b_0$, ..., and $g_0$, respectively, may meet the above conditions. For a minimum-bit width of 13 bits, an exemplary set of finite precision main values may be:

$$\begin{pmatrix} a_0 \\ b_0 \\ c_0 \\ d_0 \\ e_0 \\ f_0 \\ g_0 \end{pmatrix} = \frac{1}{2^{13}} \begin{pmatrix} 2^{12} \\ 5681 \\ 5352 \\ 4816 \\ 3218 \\ 2217 \\ 1130 \end{pmatrix}. \quad (37)$$

While the analysis to determine a minimum width for finite precision main values has been for an 8×8 effective transform matrix, a similar analysis may also be implemented for an effective transform matrix where at least one dimension may be four points, for example.

The above analysis may assume that the theoretical 2D 8×8 DCT is of infinite precision and this need not be the case. The ideal or theoretical forward transform or 2D DCT is of infinite precision and may, in some instances, be well approximated with high fidelity by 64-bit floating-point calculations, for example.

The 2D DCT algorithm may be implemented in the forward transform block 108 in a manner that may enable flexibility in operation. For example, the precision of the transform coefficients may be selected from a plurality of finite precision-bit widths as long as the conditions in Equations (34), (35), and (36) are satisfied. In this regard, a set of coefficients such as those provided in Equation (37) may be utilized.

The forward transform block 108 may support the implementation of the 2D DCT algorithm using one of a single 2D operation and two separable 1D operations, for example. When the 2D implementation is selected, the data path-bit width may be larger for intermediate results when compared to the two separable 1D operations. When the implementation based on two separable 1D operations is selected, the order in which the row or horizontal data transforms and the column or vertical data transforms are performed may be flexible. In an exemplary embodiment of the forward transform block 108, an 8×8 DCT algorithm may be implemented by transforming the input data rows first and transforming the resulting columns second. In this regard, the intermediate data-bit width may be limited to be within 32 bits in order to provide a cost effective implementation. Moreover, the implementation of the 2D DCT algorithm may utilize architectures that enable reducing the overall number of multiplication operations to be performed.

Figure 4:
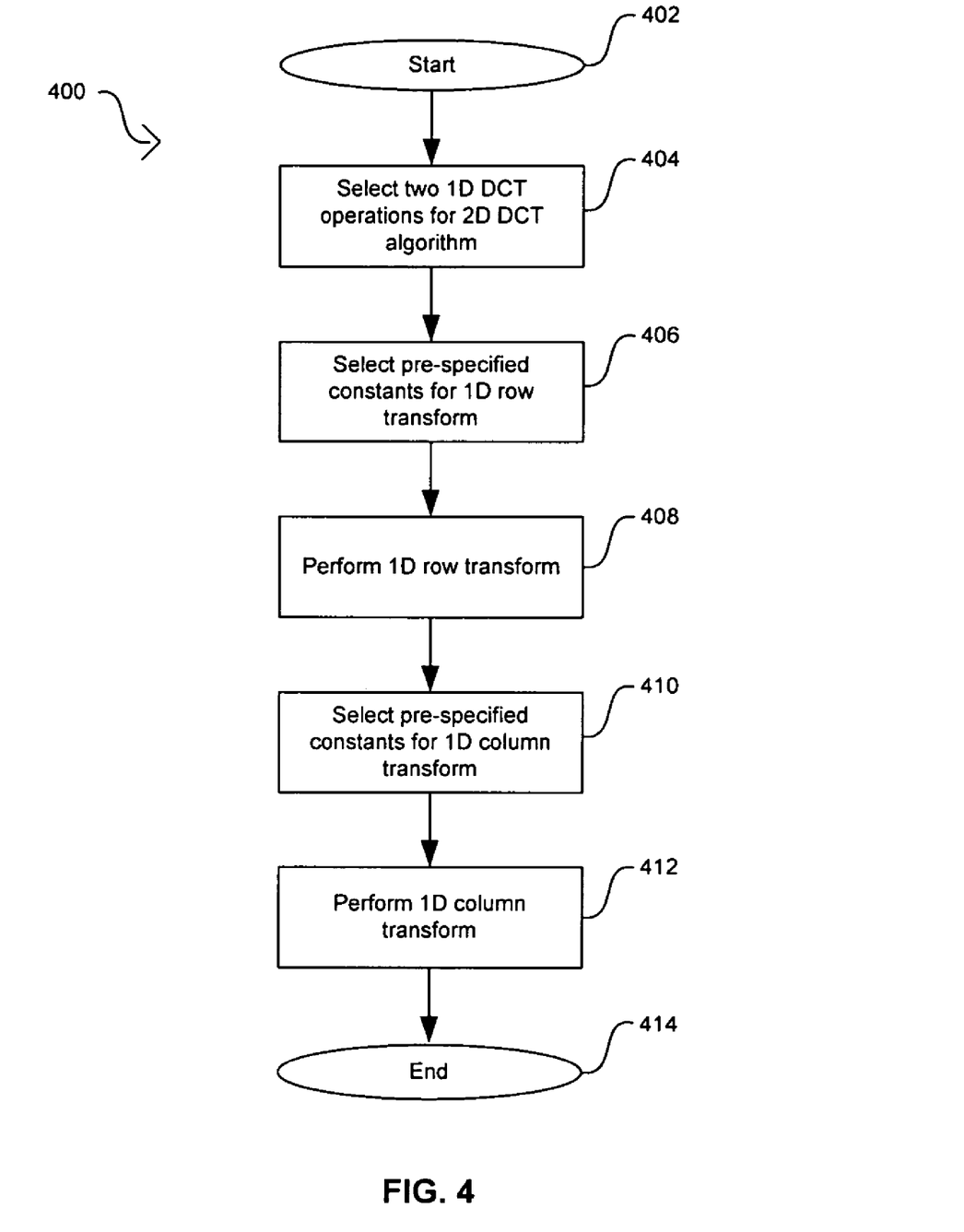
FIG. 4 is a flow chart illustrating exemplary steps for performing a 2D DCT algorithm, in accordance with an embodiment of the invention.

FIG. 4 is a flow chart illustrating exemplary steps for performing a 2D DCT algorithm, in accordance with an embodiment of the invention. Referring to FIG. 4, in step 404, after start step 402 of the flow chart 400, the coding/decoding processor 132 in FIG. 1 may be utilized to select between performing the 2D DCT algorithm in the forward transform block 108 based on a 2D transform operation or based on two separable 1D transform operations. In this regard, the forward transform block 108 may utilize the two separable 1D transform operations in order to encode the data domain samples. The first of the two separable 1D transform operations may be a 1D row transform while the second one may be a 1D column transform, for example.

In step 406, a plurality of pre-specified constants may be selected for performing the 1D row transform operation on the input matrix X, $X*T_0^{\prime}$. A row shift constant, such as ROW_SHIFT_DCT, for example, may be specified to right shift the 1D row transform results. Right-shifting may effectively regulate the-bit width of the 1D row transform results.

For example, for the transform coefficients in Equation (37), the row shift constant value may be specified as ROW_SHIFT_DCT=10, for example. A data range constant, such as INTER_DATA_RANGE_DCT, for example, may also be specified to indicate the range of the 1D row transform values. The value INTER_DATA_RANGE_DCT may be utilized to obtain a specified number of bits as the output of the 1D row transform results. For example, for ROW_SHIFT_DCT=10 and INTER_DATA_RANGE_DCT=215, the 16 MSBs, including the sign bit, of the 1D row transform results may be obtained.

In step 408, the forward transform block 108 may perform the 1D row transform operation $X*T_0'$, for example. Exemplary pseudo-code of the 1D row transform operation performed by the forward transform block 108 may be as follows:

```
int F[8][8];
int Y[8][8];
int rnd = (1<<(ROW_SHIFT_DCT-1));
int x, y, k, tmp;
for (y=0; y<8; y++)
{
    for (x=0;x<8;x++)
    {
        tmp = 0;
        for (k=0; k<8; k++)
            tmp += X[y][k]*t[x][k];
        F[y][x] = (tmp>=0)?
        ((tmp+rnd)>>ROW_SHIFT_DCT)&
        (INTER_DATA_RANGE_DCT-1):
        -(((-tmp+rnd)>>ROW_SHIFT_DCT)&
        (2*INTER_DATA_RANGE_DCT-1));
    }
},
``` where F is a matrix for storing the intermediate results of the 1D row transform operation, the pre-specified constants ROW_SHIFT_DCT and INTER_DATA_RANGE_DCT may be utilized for rounding the 1D row transform results and for obtaining the specified-bit width from the rounded 1D row transform results respectively.

In step 410, a plurality of pre-specified constants may be selected for performing the 1D column transform $T_0*Y/2$. A right shift constant, such as COL_SHIFT_DCT, for example, may be specified to right shift the 1D column transform results. The value of COL_SHIFT_DCT may be based on the set of transform coefficients to be utilized and/or on the value of the ROW_SHIFT_DCT constant. For example, when ROW_SHIFT_DCT=10 and the transform coefficients in Equation (37) are utilized, the right shift constant for the 1D column transform may be COL_SHIFT_DCT=20. A data range constant, such as DCT_DATA_RANGE, for example, may also be specified to indicate a range the values to be obtained for the results of the 1D column transform operation. For example, when 9-bit signed input data is utilized, the data range constant may be specified as DCT_DATA_RANGE=2048, indicating that the final data range for the results of the 1D column transform may range from −2048 to 2047, inclusive.

In step 412, the forward transform block 108 may perform the 1D column transform operation $T_0*F/2$, where F comprises the matrix results from the 1D row transform operation. The results of $T_0*F/2$ may be stored in the matrix Y, for example. Exemplary pseudo-code of the 1D column transform operation performed by the forward transform block 108 may be as follows:

```
int F[8][8];
int Y[8][8];
int rnd = (1<<(COL_SHIFT_DCT-1));
int x, y, k, tmp;
for (x=0; x<8; x++)
{
    for (y=0;y<8;y++)
    {
        tmp = 0;
        for(k=0; k<8; k++)
            tmp += t[y][k]*F[k][x];
        Y[y][x]=(tmp>=0)? (tmp+rnd)>>COL_SHIFT_DCT :
        -((-tmp+rnd)>>COL_SHIFT_DCT);
        Y[y][x] =
        clip3(-DCT_DATA_RANGE, DCT_DATA_RANGE-1,
        F[y][x]);
    }
},
``` where the pre-specified constants COL_SHIFT_DCT and DCT_DATA_RANGE may be utilized for rounding the 1D column transform results and for obtaining the specified-bit width from the rounded 1D column transform results respectively.

Notwithstanding the DCT pseudo-code describing the 1D row transform operation and the 1D column transform operation, the DCT need not be so limited. For example, in some instances, a Fast DCT implementation may be utilized. In this regard, the transform coefficients utilized in a Fast DCT implementation may be determined in a similar manner as for the DCT implementation described in steps 408 and 412.

In an exemplary embodiment of the forward transform block 108, the 2D DCT algorithm may be implemented by utilizing 32-bit operations. In this regard, the 2D DCT algorithm may be implemented using fast DCT architectures that utilize 32-bit integer arithmetic operations and 16-bit operands, for example.

Figure 5:
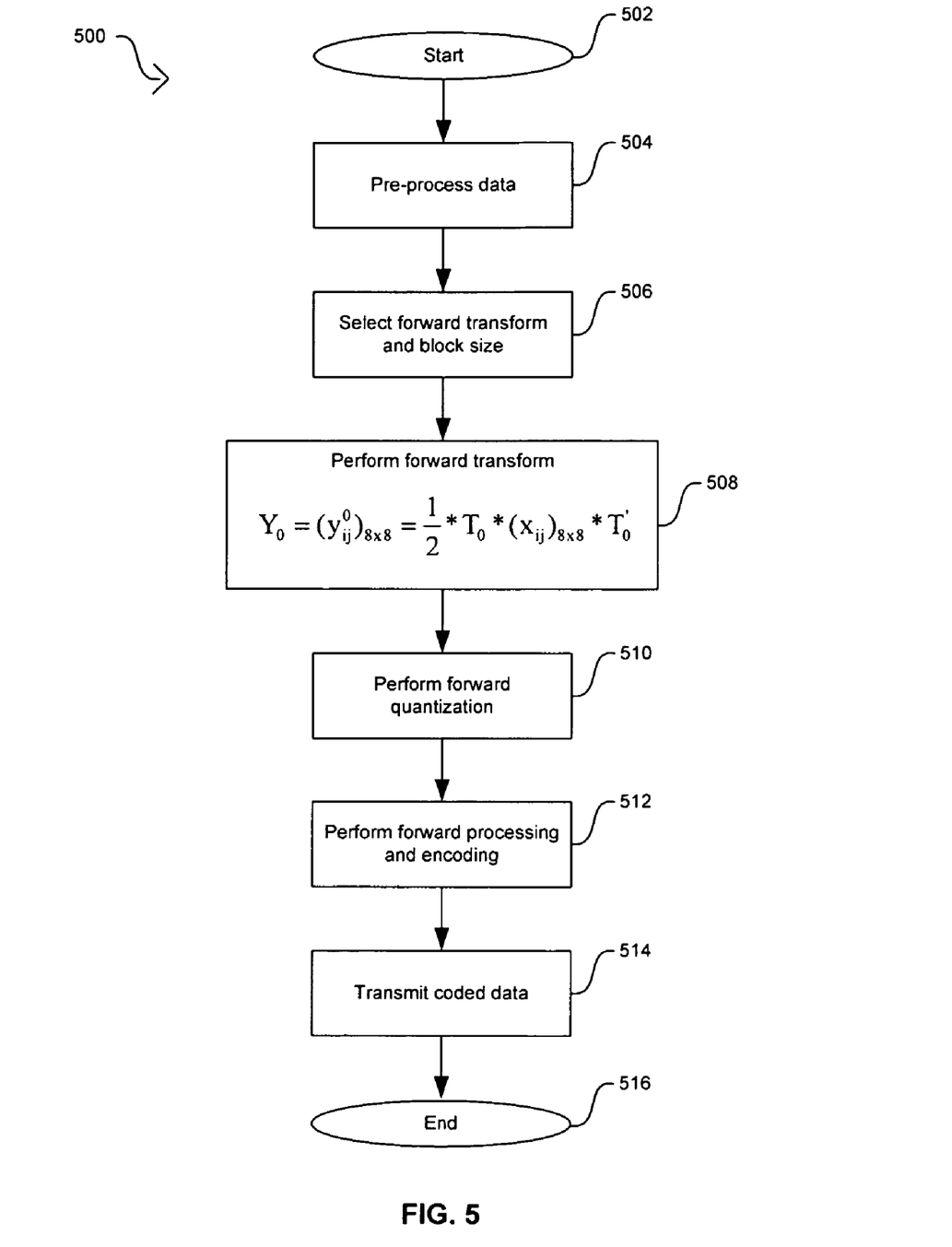
FIG. 5 is a flow chart illustrating exemplary steps that may be utilized during an M×N DCT algorithm based on a minimum number of F MSBs for the transform coefficients in the effective transform matrix, in accordance with an embodiment of the invention.

FIG. 5 is a flow chart illustrating exemplary steps that may be utilized during an M×N DCT algorithm based on a minimum number of F bits for the transform coefficients in the effective transform matrix, in accordance with an embodiment of the invention. Referring to FIG. 5, after start step 502, in step 504, a coding flow chart 500 in an illustrative DCT algorithm operation may begin by pre-processing the input data from the data stream as shown in FIG. 1. After pre-processing, an M×N block size and the transform coefficients for an M×N transform matrix may be selected in step 506. In step 508, the forward transform operation, in this example a 2D DCT algorithm, may be applied to the blocks of pre-processed input data or data domain samples in the forward transform block 108. The 2D DCT algorithm may be as described in Equation (28), for example. In this regard, the finite precision main values $a_0, b_0, \ldots$ and $g_0$ in $T_0$ may comprise at least F bits of the reference transform matrix coefficients a, b . . . and g. The value of F may be based on the conditions provided in Equations (34), (35) and/or (36), for example, and/or on the size of the input data. The number F may differ from the number R that may be utilized in the 2D IDCT algorithm.

Following the DCT operation in step 508, a forward quantization operation may be applied in step 510 by the forward quantization block 110 to the transform domain samples of the output matrix $Y_0$. The forward quantization parameters utilized in step 510 be stored, for example, in the table B 116 in FIG. 1 and may be transferred to the forward quantization block 110 during operation. Following the forward quantization operation, the forward processing and encoding block 112 may process the quantized and transformed input data in step 512. Once the forward processing and encoding are completed, the coded data may be transmitted in step 514. After step 514, the coding flow chart 50 may proceed to end step 516.

Figure 6:
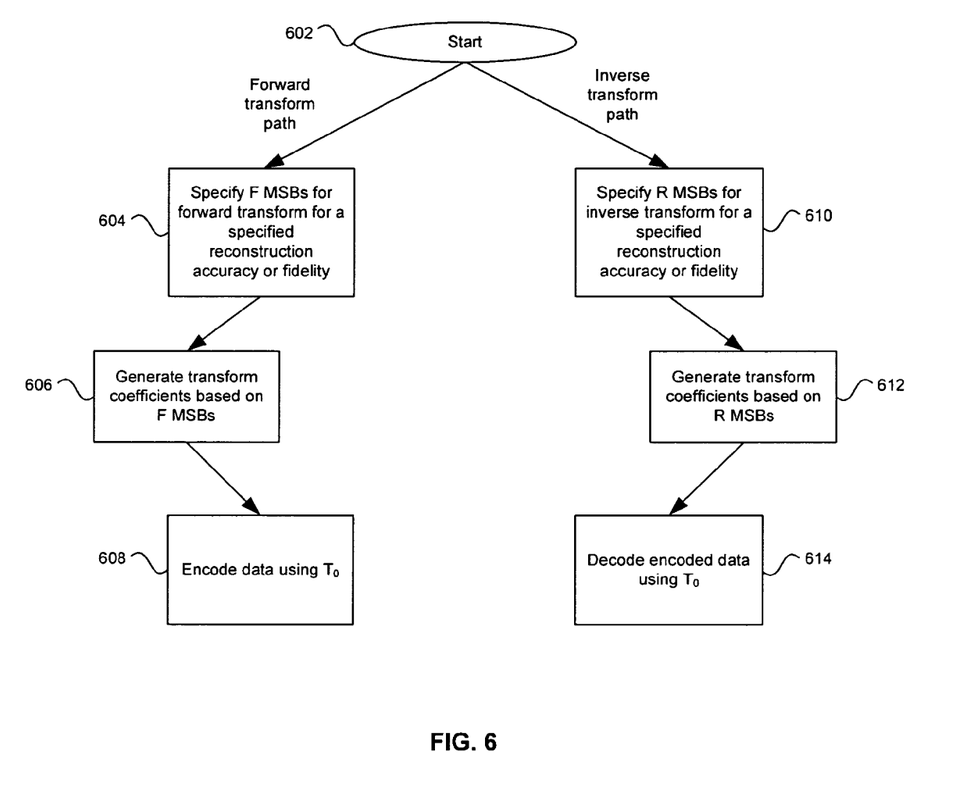
FIG. 6 is a flow chart illustrating exemplary steps that may be utilized for codifying signals that ensure high fidelity reconstruction in accordance with an embodiment of the invention.

FIG. 6 is a flow chart illustrating exemplary steps that may be utilized for codifying signals that ensure high fidelity reconstruction in accordance with an embodiment of the invention. Referring to FIG. 6, after start step 602, a forward transform path or an inverse transform path are shown. In the forward transform path, in step 604, the F bits derived out of a finite number of bits of the main values a, b, . . . and g in T and based on the conditions provided in Equations (34), (35) and/or (36), for example, and/or on the size of the input data may be specified for the forward transform operation. In step 606, the transform coefficients may be determined based on the predetermined F bits. In step 608, the data may be encoded in, for example, a portion of the data coding and decoding system 100 in FIG. 1 by utilizing the effective transform matrix $T_0$.

In the inverse transform path, in step 610, the R bits derived out of a finite number of bits of the main values a, b, . . . and g in T and based on the conditions provided in Equations (20a), (20b) and/or (21), for example, and/or on the size of the input data may be specified for the inverse transform operation. In step 612, the transform coefficients may be determined based on the predetermined R bits. In step 614, the data may be decoded in, for example, a portion of the data coding and decoding system 100 in FIG. 1 by utilizing the effective transform matrix, $T_0$.

Figure 7:
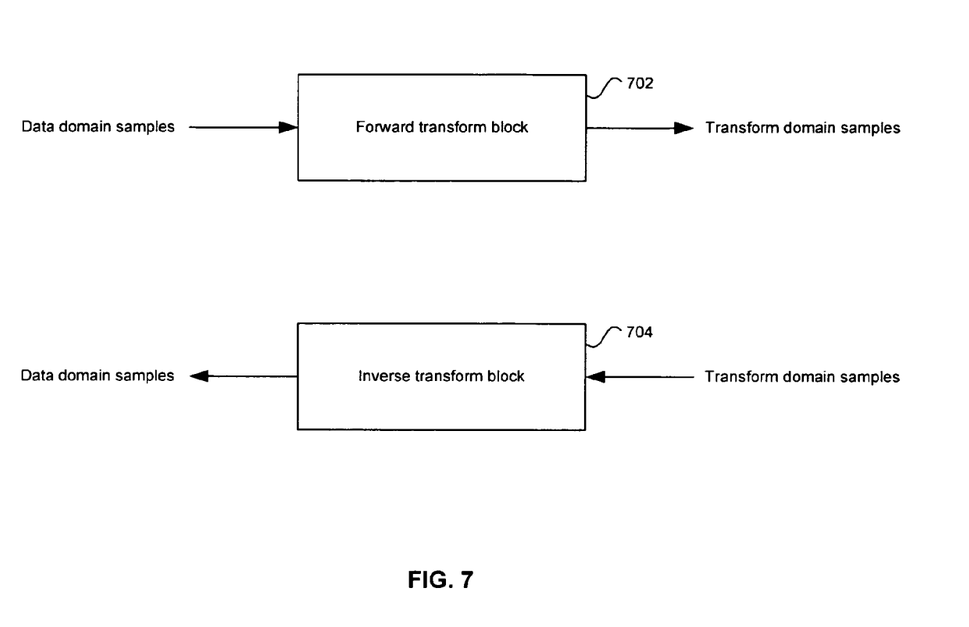
FIG. 7 is a block diagram illustrating exemplary systems that utilize high fidelity transforms, in accordance with an embodiment of the invention.

FIG. 7 is a block diagram illustrating exemplary systems that utilize high fidelity transforms, in accordance with an embodiment of the invention. Referring to FIG. 7, there is shown a forward transform block 702 and an inverse transform block 704. The forward transform block 702 and the inverse transform block 704 may be implemented in the same device or may be implemented in separate devices. The forward transform block 702 may comprise suitable logic, circuitry, and/or code that may enable processing data domain samples and to generate transform domain samples by utilizing a transform matrix with transform coefficients whose effective values comprise a F bits derived out of a finite number of bits of the main values a, b, . . . and g in T and based on the conditions provided in Equations (34), (35) and/or (36), for example, and/or on the size of the input data may be specified for the forward transform operation. The effective value of the transform coefficients comprising the predetermined number of F-bit values provides a specified reconstruction accuracy or fidelity that may not require mismatch error control.

The inverse transform block 704 may comprise suitable logic, circuitry, and/or code that may enable processing transform domain samples and to generate data domain samples by utilizing a transform matrix with transform coefficients whose effective values comprise a predetermined number of R bits derived out of a finite number of bits of the main values a, b, . . . and g in T and based on the conditions provided in Equations (20a), (20b) and/or (21), for example, and/or on the size of the input data. The effective value of the transform coefficients comprising the predetermined number of R-bit values provides a specified reconstruction accuracy or fidelity that may not require mismatch error control.

The approach described herein provides flexibility by allowing system designers to implement coding/decoding systems into a system architecture that best suits operational and cost requirements while at the same time providing high fidelity reconstruction without the need for mismatch error control.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments failing within the scope of the appended claims.

What is claimed is:

1. A method for signal processing, the method comprising: in a video processing device comprising one or more circuits that are operable to process video data:
receiving a plurality of a first domain samples and a specified reconstruction accuracy and/or fidelity for a two-dimensional (2D) transformation; and
generating a plurality of a second domain samples from said 2D transformation of said received plurality of first domain samples based on a transform matrix, wherein each transform coefficient of said transform matrix comprises an integer-bit value determined from a corresponding coefficient of a reference transform matrix, said determined integer-bit values selected based on:
said specified reconstruction accuracy and/or fidelity for said 2D transformation; and
criteria determined from separating said 2D transformation into first and second one-dimensional (1D) transformations, said criteria ensuring that a mismatch between a 2D transformation using said transform matrix and a 2D transformation using the reference transform matrix is upper-bounded by 1.

2. The method according to claim 1, comprising scaling an infinite precision transform matrix by $\sqrt{2}$ to generate said reference transform matrix.

3. The method according to claim 1, wherein said first domain samples are a plurality of transform domain samples.

4. The method according to claim 1, wherein said first domain samples are a plurality of data domain samples.

5. The method according to claim 1, wherein said 2D transformation is an inverse discrete cosine transform (IDCT).

6. The method according to claim 1, wherein said 2D transformation is a discrete cosine transform (DCT).

7. The method according to claim 1, wherein at least one dimension of said 2D transformation comprises at least four points.

8. The method according to claim 1, wherein each said determined integer-bit value is programmable with a constraint of being equal to or larger than a determined minimum value.

9. A non-transitory machine-readable storage having stored thereon, a computer program having at least one code section for signal processing, the at least one code section being executable by a machine for causing the machine to perform steps comprising:
- receiving a plurality of a first domain samples and a specified reconstruction accuracy and/or fidelity for a two-dimensional (2D) transformation; and
- generating a plurality of a second domain samples from said 2D transformation of said received plurality of first domain samples based on a transform matrix, wherein each transform coefficient of said transform matrix comprises an integer-bit value determined from a corresponding coefficient of a reference transform matrix coefficient, said determined integer-bit values selected is based on:
- said specified reconstruction accuracy and/or fidelity for said 2D transformation; and
- criteria determined from separating said 2D transformation into first and second one-dimensional (1D) transformations, said criteria ensuring that a mismatch between a 2D transformation using said transform matrix and a 2D transformation using the reference transform matrix is upper-bounded by 1.

10. The non-transitory machine-readable storage according to claim 9, wherein an infinite precision transform matrix is scaled by $\sqrt{2}$ to generate said reference transform matrix.

11. The non-transitory machine-readable storage according to claim 9, wherein said first domain samples are a plurality of transform domain samples.

12. The non-transitory machine-readable storage according to claim 9, wherein said first domain samples are a plurality of data domain samples.

13. The non-transitory machine-readable storage according to claim 9, wherein said 2D transformation is an inverse discrete cosine transform (IDCT).

14. The non-transitory machine-readable storage according to claim 9, wherein said 2D transformation is a discrete cosine transform (DCT).

15. The non-transitory machine-readable storage according to claim 9, wherein at least one dimension of said 2D transformation comprises at least four points.

16. The non-transitory machine-readable storage according to claim 9, wherein each said determined integer-bit value is programmable with a constraint of being equal to or larger than a determined minimum value.

17. A system for signal processing, the system comprising:
- circuitry that enables receiving a plurality of a first domain samples and a specified reconstruction accuracy and/or fidelity for a two-dimensional (2D) transformation; and
- said circuitry enables generating a plurality of a second domain samples from said 2D transformation of said received plurality of first domain samples based on a transform matrix, wherein each transform coefficient of said transform matrix comprises an integer-bit value determined from a corresponding coefficient of a reference transform matrix coefficient, said determined integer-bit values selected based on:
- said specified reconstruction accuracy and/or fidelity for said 2D transformation; and
- criteria determined from separating said 2D transformation into first and second one-dimensional (1D) transformations, said criteria ensuring that a mismatch between a 2D transformation using said transform matrix and a 2D transformation using the reference transform matrix is upper-bounded by 1.

18. The system according to claim 17, wherein an infinite precision transform matrix is scaled by $\sqrt{2}$ to generate said reference transform matrix.

19. The system according to claim 17, wherein said first domain samples are a plurality of transform domain samples.

20. The system according to claim 17, wherein said first domain samples are a plurality of data domain samples.

21. The system according to claim 17, wherein said 2D transformation is an inverse discrete cosine transform (IDCT).

22. The system according to claim 17, wherein said 2D transformation is a discrete cosine transform (DCT).

23. The system according to claim 17, wherein at least one dimension of said 2D transformation comprises at least four points.

24. The system according to claim 17, wherein said determined integer is programmable with a constraint of being equal to or larger than a determined minimum value.

* * * * *